(12) United States Patent
Yamada

(10) Patent No.: US 10,843,684 B2
(45) Date of Patent: Nov. 24, 2020

(54) PARKING ASSIST APPARATUS

(71) Applicant: TOYOTA JIDOSHA KABUSHIKI KAISHA, Toyota (JP)

(72) Inventor: Aya Yamada, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 16/181,494

(22) Filed: Nov. 6, 2018

(65) Prior Publication Data

US 2019/0176813 A1 Jun. 13, 2019

(30) Foreign Application Priority Data

Dec. 7, 2017 (JP) .................................. 2017-235053

(51) Int. Cl.
*B60W 30/06* (2006.01)
*B62D 15/02* (2006.01)
*G05B 13/02* (2006.01)

(52) U.S. Cl.
CPC ......... *B60W 30/06* (2013.01); *B62D 15/0285* (2013.01); *G05B 13/0265* (2013.01)

(58) Field of Classification Search
CPC B60W 30/06; B62D 15/0285; G05B 13/0265
See application file for complete search history.

(56) References Cited

U.S. PATENT DOCUMENTS

| | | | | |
|---|---|---|---|---|
| 9,140,553 | B2* | 9/2015 | Grimm | B60W 30/06 |
| 10,268,201 | B2* | 4/2019 | Iwama | B60R 1/002 |
| 10,414,437 | B2* | 9/2019 | Pilutti | B60W 50/14 |
| 2002/0041239 | A1* | 4/2002 | Shimizu | B62D 15/027 |
| | | | | 340/932.2 |
| 2007/0299572 | A1* | 12/2007 | Okamoto | B62D 15/02 |
| | | | | 701/28 |
| 2008/0084287 | A1* | 4/2008 | Sturm | B60W 50/14 |
| | | | | 340/438 |
| 2008/0174452 | A1* | 7/2008 | Yamamoto | B62D 15/0275 |
| | | | | 340/932.2 |
| 2009/0171563 | A1* | 7/2009 | Morimoto | G08G 1/0962 |
| | | | | 701/533 |
| 2009/0322565 | A1* | 12/2009 | Faber | B62D 15/027 |
| | | | | 340/932.2 |

(Continued)

FOREIGN PATENT DOCUMENTS

| | | |
|---|---|---|
| JP | 2008-536734 A | 9/2008 |
| JP | 2011-141854 A | 7/2011 |
| JP | 2013-530867 A | 8/2013 |

*Primary Examiner* — Babar Sarwar
(74) *Attorney, Agent, or Firm* — Sughrue Mion, PLLC

(57) ABSTRACT

A parking assist apparatus (13) has: a learning device (131) configured to learn a first position (WP_start) that is a position of the vehicle when a driver starts a parking operation, a second position (WP_shift) that is a position of the vehicle when the driver changes a shift range of the vehicle and a third position (WP_end) that is a position when the driver completes the parking operation during a period when the driver performs the parking operation; and a generating device (132) configured to generate, as a target route (TR_target) along which the vehicle should travel when the vehicle is automatically parked, a traveling route that reaches the third position from the first position via the second position on the basis of a learning result.

6 Claims, 10 Drawing Sheets

(56) References Cited

U.S. PATENT DOCUMENTS

2011/0166783 A1\* 7/2011 Ren .................... G01C 21/3638
 701/455
2013/0085637 A1\* 4/2013 Grimm .................... G05D 1/00
 701/25

\* cited by examiner

PARKING ASSIST APPARATUS

TECHNICAL FIELD

The present invention relates to a technical field of a parking assist apparatus that is configured to execute a parking assist for automatically parking a vehicle in a parking space, for example.

BACKGROUND ART

A Patent Literature 1 discloses one example of a parking assist apparatus. Specifically, the Patent Literature 1 discloses the parking assist apparatus that is configured to operate in two modes including a learning more and an operating mode. The parking assist apparatus operating in the learning mode is configured to learn a reference route along which a vehicle travels from a reference start position to a parking position when a driver parks the vehicle in the parking space (for example, a garage) by a driver's operation, wherein the reference start position is a position at which the vehicle starts to travel and the parking position is a position at which the vehicle is parked. The parking assist apparatus operating in the operating mode is configured to automatically park the vehicle in the parking space in which the vehicle is parked in the learning mode by using a leaning result in the learning mode. As a result, the vehicle is parked in a parking position that is same as a parking position in the parking space in which the vehicle is parked in the learning mode.

Note that there are a Patent Literature 2 and a Patent Literature 3 as another document relating to the present invention.

CITATION LIST

Patent Literature

[Patent Literature 1] Japanese Unexamined Patent Application Publication No. 2013-530867
[Patent Literature 2] Japanese Unexamined Patent Application Publication No. 2011-141854
[Patent Literature 3] Japanese Unexamined Patent Application Publication No. 2008-536734

SUMMARY OF INVENTION

Technical Problem

The parking assist apparatus disclosed in the Patent Literature 1 learns the reference route along which the vehicle travels from the reference start position at which the vehicle starts to travel to the parking position at which the vehicle is parked, in order to automatically park the vehicle in the parking space. However, there is a possibility that the driver's operation includes an unnecessary operation (for example, an operation that turns a steered wheel too much). Thus, there is a possibility that the driver's unnecessary operation affects the reference route learned by the parking assist apparatus in the learning mode. Therefore, there is a possibility that the parking assist apparatus disclosed in the Patent Literature 1 controls the vehicle such that the vehicle travels along an undesired traveling route, when the parking assist apparatus disclosed in the Patent Literature 1 automatically parks the vehicle in the parking space. Namely, there is a possibility that the parking assist apparatus disclosed in the Patent Literature 1 is not capable of allowing the vehicle to travel along a desired traveling route, when the parking assist apparatus disclosed in the Patent parks the vehicle in the parking space.

The above described technical problem is one example of the technical problem to be solved by the present invention. It is therefore an object of the present invention to provide, for example, a parking assist apparatus that is configured to park the vehicle in the parking space while allowing the vehicle to travel along the appropriate traveling route.

Solution to Problem

One aspect of a parking assist apparatus of the present invention is a parking assist apparatus having: a learning device that is configured to learn a first position, a second position and a third position during a period when a driver performs a parking operation for parking a vehicle, the first position being a position of the vehicle when the driver starts to perform the parking operation, the second position being a position of the vehicle when the driver changes a shift range of the vehicle, the third position being a position when the driver completes the parking operation; and a generating device that is configured to generate, as a target route along which the vehicle should travel when the vehicle is automatically parked, a traveling route that reaches the third position from the first position via the second position on the basis of a learned result of the learning device.

Each of FIG. 8A to FIG. 8E is a graph that illustrates a curvature of the actual traveling route.

Figure 9:
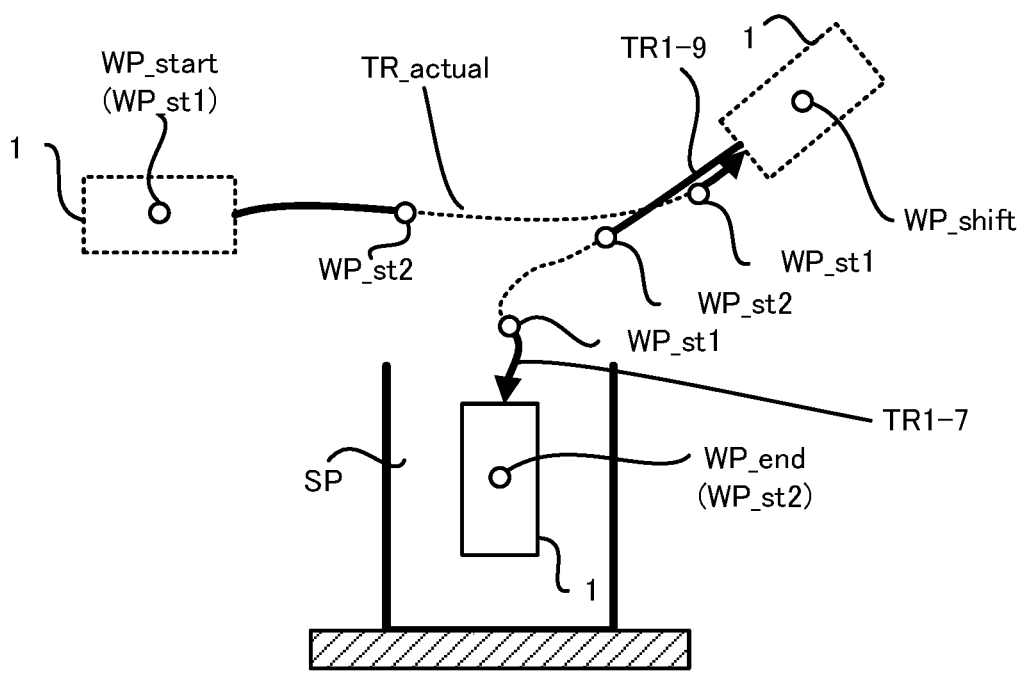

FIG. 9 is a planar view that associates the straight traveling start waypoint and the straight traveling end waypoint with the actual traveling route.

Figure 10:
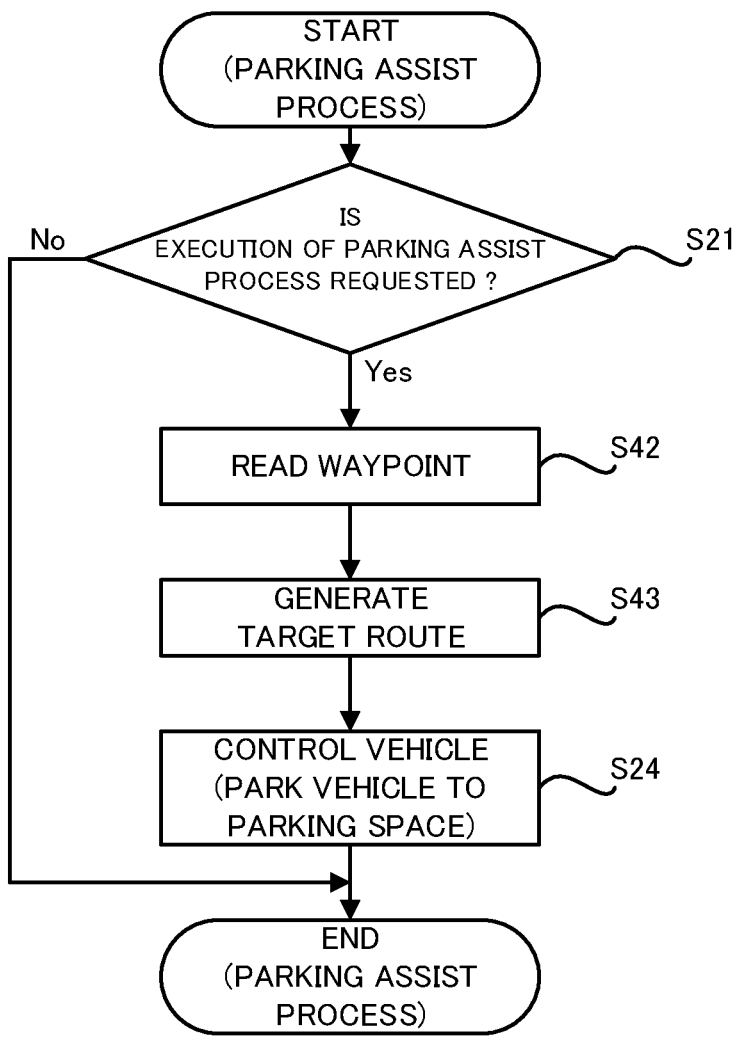

FIG. 10 is a flowchart that illustrates a flow of the parking assist process in the first modified example.

Figure 11A:
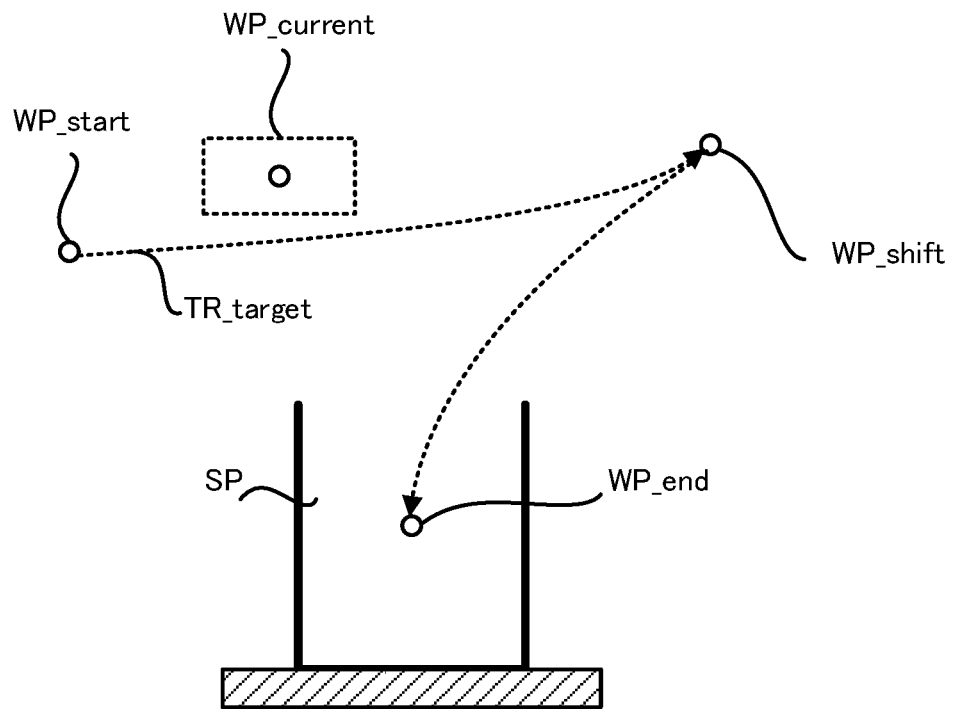
Figure 11B:
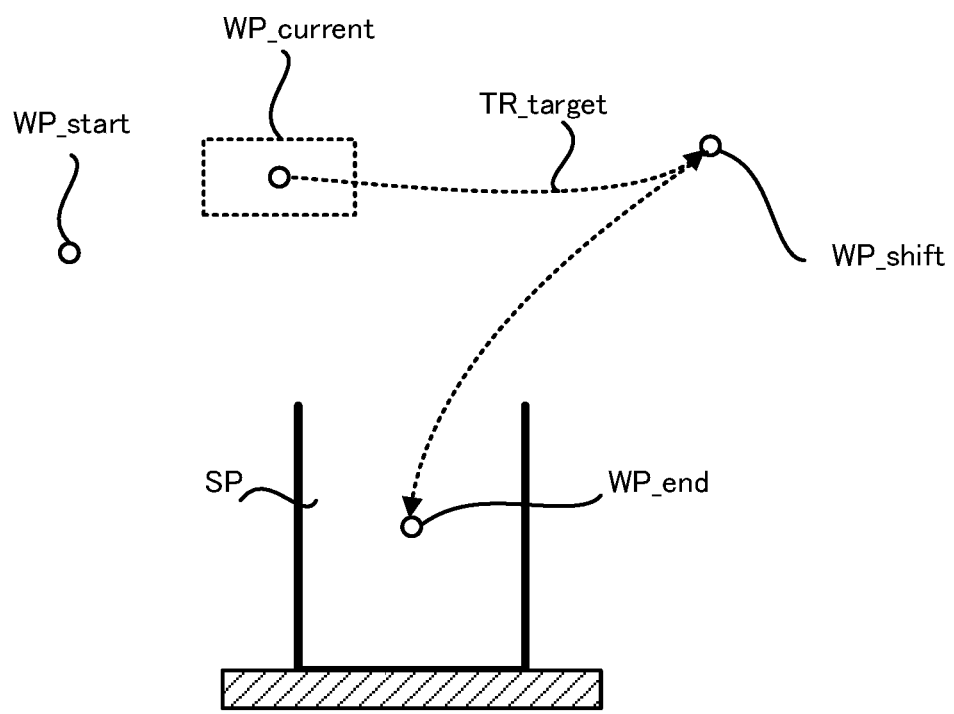

FIG. 11A is a planer view that illustrates the vehicle not located at the start waypoint when the parking assist process starts and FIG. 11B is a planer view that illustrates the target route generated in the situation illustrated in FIG. 11A.

DESCRIPTION OF EMBODIMENTS

Hereinafter, with reference to drawings, one embodiment of the parking assist apparatus of the present invention will be described. In the following description, a vehicle 1 to which one embodiment of the parking assist apparatus of the present invention is adapted will be described.

(1) Structure of Vehicle 1

Figure 1:
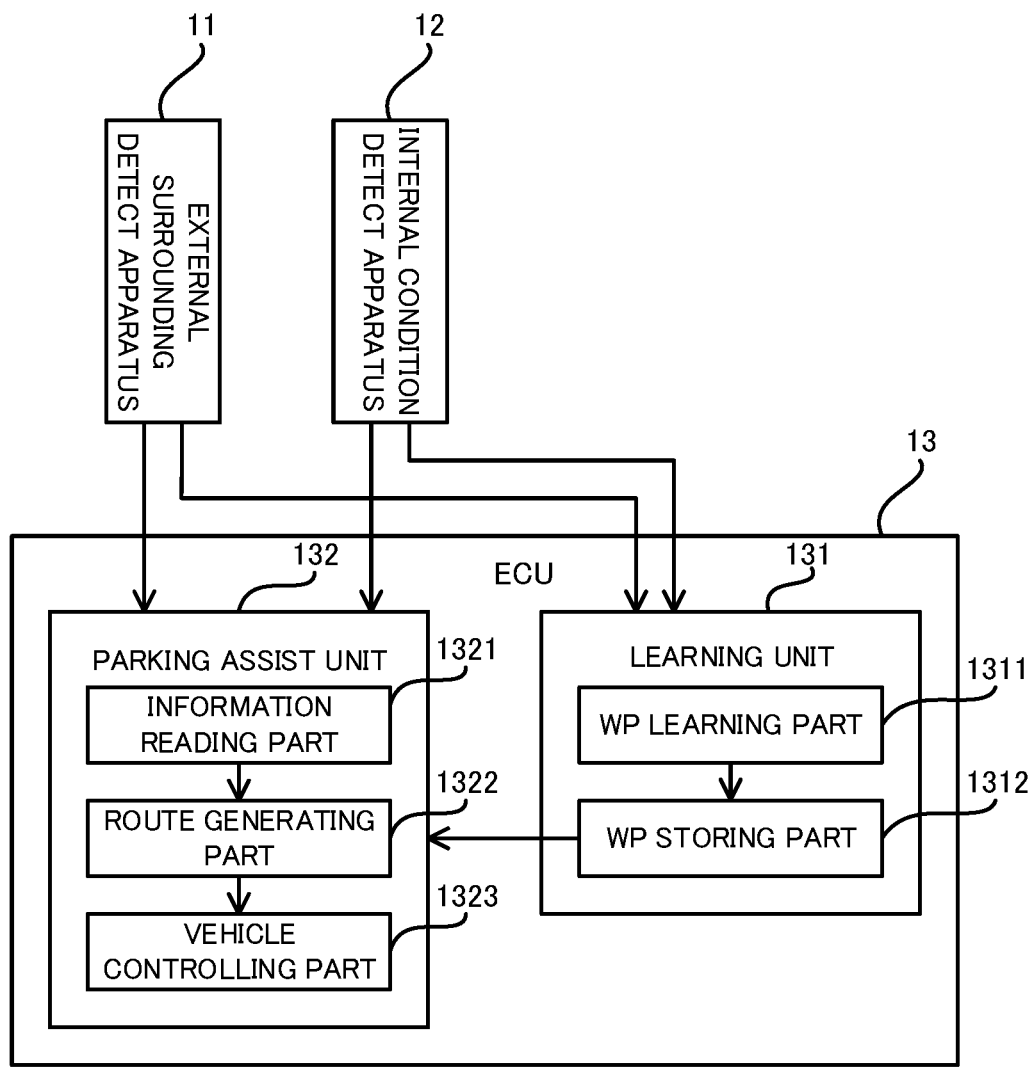
FIG. 1 is a block diagram that illustrates a structure of a vehicle in a present embodiment.

Firstly, with reference to FIG. 1, the structure of the vehicle 1 in the present embodiment will be explained. As illustrated in FIG. 1, the vehicle 1 has: an external surrounding detect apparatus 11; an internal condition detect apparatus 12; and an ECU (Electronic Control Unit) 13 that is one example of each of a "parking assist apparatus" and a "controller" in a below described additional statement.

The external surrounding detect apparatus 11 is a detect apparatus that is configured to detect an external surrounding (in other words, an external circumstance, condition or situation) of the vehicle 1. The external surrounding may include a condition or a situation around the vehicle (what we call a traveling environment or a driving environment), for example. The external surrounding detect apparatus 11 includes at least one of a camera, a radar and a LIDAR (Light Detection and Ranging), for example.

The internal condition detect apparatus 12 is a detect apparatus that is configured to detect an internal condition (in other words, an internal state) of the vehicle 1. The internal condition may include a traveling condition (in other words, a driving condition) of the vehicle 1, for example. The internal condition may include an operating condition (in other words, an operating state) of each of various devices of the vehicle 1, for example. The internal condition detect apparatus 12 includes at least one of a speed sensor that is configured to detect a speed of the vehicle 1, a shift position sensor that is configured to detect a shift range (in other words, a gear range or a shift position) of the vehicle 1, a steering angle sensor that is configured to detect a steering angle (for example, a rotational angle) of a steering wheel of the vehicle 1, a steered angle sensor that is configured to detect a steered angle (in other words, a rudder angle) of a steered wheel (in other word, a steered tire) of the vehicle 1 and a position sensor (for example, a GPS (Global Positioning System) sensor) that is configured to detect a position of the vehicle 1.

The ECU 13 is configured to control entire operation of the vehicle 1. Especially in the present embodiment, the ECU 13 is configured to execute a learning process for learning, as a waypoint WP, the position of the vehicle 1 at a specified timing when a driver parks the vehicle 1 in a desired parking space SP. Moreover, the ECU 13 is configured to execute a parking assist process for automatically parking the vehicle 1 in the desired parking space SP on the basis of the waypoint WP learned by the learning process.

In order to execute the learning process, the ECU 13 includes, as processing block that is logically realized in the ECU 13 or processing circuit that is physically realized in the ECU 13, a learning unit 131 that is one example of a "learning device" in the below described additional statement. The learning unit 131 includes, as a processing blocks that are logically realized in the learning unit 131 or a processing circuits that are physically realized in the learning unit 131, a waypoint learning part 1311 (hereinafter, the waypoint learning part 1311 is referred to as a "WP learning part 1311") and a waypoint storing part 1312 (hereinafter, the waypoint storing part 1312 is referred to as a "WP storing part 1312"). Moreover, in order to execute the parking assist process, the ECU 13 includes, as a processing block that is logically realized in the ECU 13 or a processing circuit that is physically realized in the ECU 13, a parking assist unit 132 that is one example of a "generating device" in the below described additional statement. The parking assist unit 132 includes, as processing blocks that are logically realized in the parking assist unit 132 or processing circuits that are physically realized in the parking assist unit 132, an information reading part 1321, a route generating part 1322 and a vehicle controlling part 1323. Note that the operation of each of the learning unit 131 and the parking assist unit 132 will be described later in detail with reference to FIG. 2 and so on.

(2) Operation of ECU 13

Next, the learning process and the parking assist process that are executed by the ECU 13 will be described in order.

(2-1) Flow of Learning Process

Figure 2:
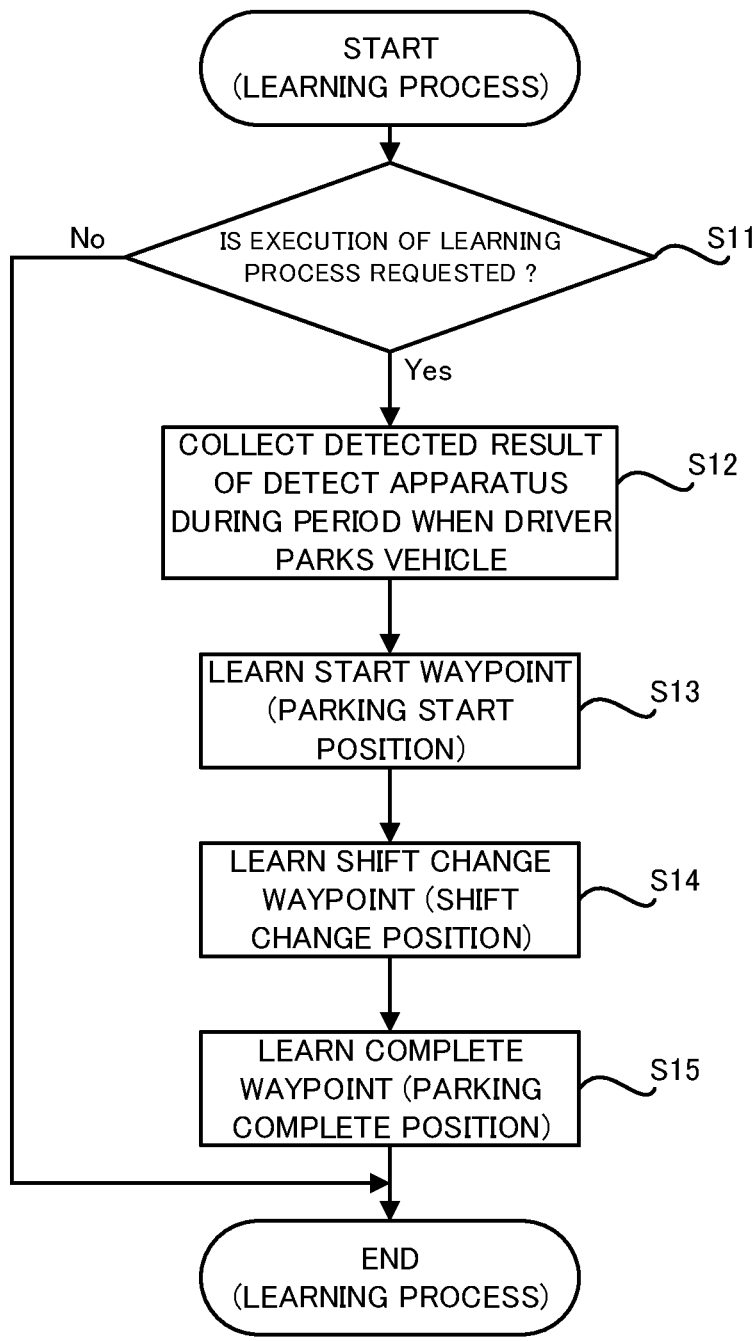
FIG. 2 is a flowchart that illustrates a flow of a learning process in the present embodiment.

Firstly, with reference to FIG. 2, a flow of the learning process in the present embodiment will be described. FIG. 2 is a flowchart that illustrates the flow of the learning process in the present embodiment.

As illustrated in FIG. 2, the learning unit 131 determines whether or not the driver requests an execution of the learning process (a step S11). Specifically, the learning unit 131 determines whether or not the driver operates an operating apparatus (especially, an operating apparatus that is configured to be operated by the driver to request the execution of the learning process) of the vehicle 1. If the driver operates the operating apparatus, the learning unit 131 determines that the driver requests the execution of the learning process. Note that the learning process is executed when the driver performs a parking operation for parking the vehicle 1 in the desired parking space SP. Thus, the driver typically requests the execution of the learning process before starting to perform the parking operation.

As a result of the determination at the step S11, if it is determined that the driver does not request the execution of the learning process (the step S11: No), the learning unit 131 terminates the learning process illustrated in FIG. 2. When the learning unit 131 terminates the learning process illustrated in FIG. 2, the learning unit 131 starts the learning process illustrated in FIG. 2 again after a first predetermined period elapses.

On the other hand, as a result of the determination at the step S11, if it is determined that the driver requests the execution of the learning process (the step S11: Yes), the WP learning part 1311 collects a detection information that is a detected result of the external circumstance detect apparatus 11 and the internal condition detect apparatus 12 during a period when the driver parks the vehicle 1 by performing the parking operation (a step S12).

Then, the WP learning part 1311 learns, as a start waypoint WP_start, the position of the vehicle 1 at a parking start timing at which the driver starts the parking operation on the basis of the detection information collected at the step S12 (a step S13). Namely, the WP learning part 1311 learns a parking start position as the start waypoint WP_start. The parking start timing may be a timing at which the driver requests the execution of the learning process. Alternatively, the parking start timing may be a timing at which the vehicle 1 starts to travel (in other words, move). Namely, the parking start timing may be a timing at which the speed of the vehicle 1 changes from zero to a value larger than zero. Alternatively, the parking start timing may be a timing at which the shift range of the vehicle 1 is changed from one range (for example, a P (Parking) range or a N (Neutral) range) that is used when the vehicle 1 stops to another range (for example, a D (Drive) range or a R (Reverse) range) that is used when the vehicle 1 travels. Note that the present embodiment is described by using an example in which the parking start timing is the timing at which the shift range of the vehicle 1 is changed from the P range or the N range to the D range, for the purpose of simple description. Namely, the present embodiment is described by using an example in which the driver parks the vehicle 1 in the parking space SP by making the vehicle 1 travel frontward from the parking start position.

Moreover, the WP learning part 1311 learns, as a shift change waypoint WP_shift, the position of the vehicle 1 at a shift change timing at which the driver changes the shift range in order to change a traveling direction of the vehicle 1 after the driver starts the parking operation on the basis of the detection information collected at the step S12 (a step S14). Namely, the WP learning part 1311 learns a shift change position as the shift change waypoint WP_shift. The shift change timing is a timing at which the shift range is changed from one range (for example, the D range) that is used to make the vehicle 1 travel frontward to another range (for example, the R range) that is used to make the vehicle 1 travel backward or from one range (for example, the R range) that is used to make the vehicle 1 travel backward to another range (for example, the D range) that is used to make the vehicle 1 travel frontward. Note that the present embodiment is described by using an example in which the shift change timing is the timing at which the shift range of the vehicle 1 is changed from the D range to the R range, for the purpose of simple description. Namely, the present embodiment is described by using an example in which the driver moves the vehicle 1 to a desired position by making the vehicle 1 travel frontward from the parking start position and then parks the vehicle 1 in the parking space SP by making the vehicle 1 travel backward.

Moreover, the WP learning part 1311 learns, as a complete waypoint WP_end, the position of the vehicle 1 at a parking complete timing at which the driver completes (in other words, ends or finishes) the parking operation on the basis of the detection information collected at the step S12 (a step S15). Namely, the WP learning part 1311 learns a parking complete position as the complete waypoint WP_end. The parking complete timing may be a timing at which the driver requests an end (in other words, a termination) of the learning process. Alternatively, the parking complete timing may be a timing at which a predetermined time elapses after the vehicle 1 stops. Namely, the parking complete timing may be a timing at which the predetermined time elapses after the speed of the vehicle 1 changes from the value larger than zero to zero. Alternatively, the parking complete timing may be a timing at which the shift range of the vehicle 1 is changed from one range that is used when the vehicle 1 travels to another range that is used when the vehicle 1 stops. Note that the present embodiment is described by using an example in which the parking complete timing is the timing at which the shift range of the vehicle 1 is changed from the R range to the P range, for the purpose of simple description.

A waypoint information that relates to the start waypoint WP_start, the shift change waypoint WP_shift and the complete waypoint WP_end learned by the WP learning part 1311 is stored by the WP storing part 1312. The waypoint information stored by the WP storing part 1312 is used by the parking assist unit 132 during a period when the below described parking assist process is executed.

(2-2) Flow of Parking Assist Process

Figure 3:
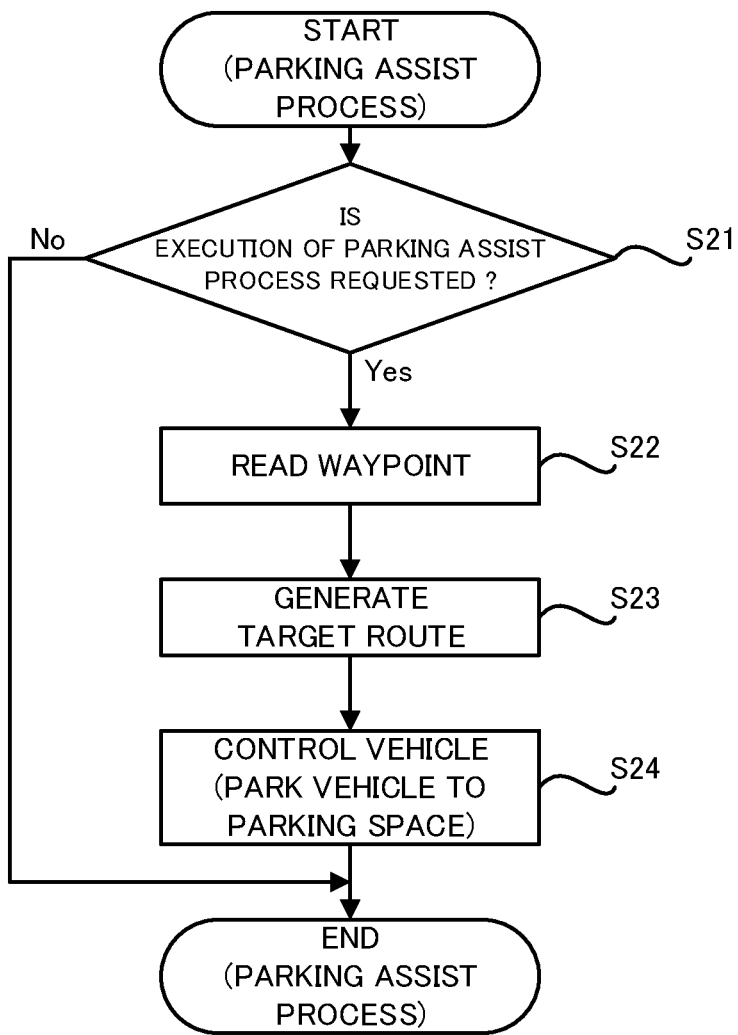
FIG. 3 is a flowchart that illustrates a flow of a parking assist process in the present embodiment.

Next, with reference to FIG. 3, a flow of the parking assist process in the present embodiment will be described. FIG. 3 is a flowchart that illustrates the flow of the parking assist process in the present embodiment.

As illustrated in FIG. 3, the parking assist unit 132 determines whether or not the driver requests an execution of the parking assist process (a step S21). Specifically, the parking assist unit 132 determines whether or not the driver operates an operating apparatus (especially, an operating apparatus that is configured to be operated by the driver to request the execution of the parking assist process) of the vehicle 1. If the driver operates the operating apparatus, the parking assist unit 132 determines that the driver requests the execution of the parking assist process.

As a result of the determination at the step S21, if it is determined that the driver does not request the execution of the parking assist process (the step S21: No), the parking assist unit 132 terminates the parking assist process illustrated in FIG. 3. When the parking assist unit 132 terminates the parking assist process illustrated in FIG. 3, the parking assist unit 132 starts the parking assist process illustrated in FIG. 3 again after a second predetermined period elapses.

On the other hand, as a result of the determination at the step S21, if it is determined that the driver requests the execution of the parking assist process (the step S21: Yes), the information reading part 1321 reads (in other words, gets, receives or obtains) the waypoint information that relates to the start waypoint WP_start, the shift change waypoint WP_shift and the complete way point WP_end and that is stored by the WP storing part 1312 (a step S22).

Then, the route generating part 1322 generates, as the target route TR_target along which the vehicle 1 should travel, a traveling route that reaches the complete waypoint WP_end from the start waypoint WP_start via the shift change waypoint WP_shift on the basis of the read waypoint information (a step S23). Note that the existing method of generating the traveling route along which the vehicle 1 travels via a specified position may be used and thus the detailed description of the method of generating the traveling route will be omitted.

Then, the vehicle controlling part 1323 makes the vehicle 1 automatically travel along the target route TR_target generated at the step S23 by controlling at least one of a power source (for example, an engine) of the vehicle 1, a brake apparatus of the vehicle 1 and a steering apparatus of the vehicle 1 (a step S24). Namely, the vehicle controlling part 1323 makes the vehicle 1 travel automatically so that the vehicle 1 reaches the complete waypoint WP_end from the start waypoint WP_start via the shift change waypoint WP_shift. Note that the present embodiment is described by using an example in which the vehicle 1 is located at the start waypoint WP_start at the timing when it is determined that the driver requests the execution of the parking assist process, for the purpose of simple description. As a result, the vehicle 1 is automatically parked in the parking space SP without requiring the user's operation of an acceleration pedal, a brake pedal, a steering wheel and a shift lever (in other words, a selector).

(3) Technical Effect

As described above, in the present embodiment, it is enough for the learning unit 131 to learn the start waypoint WP_start, the shift change waypoint WP_shift and the complete waypoint WP_end in order to automatically park the vehicle 1 in the parking space SP. Namely, the learning unit 131 need not learn an actual traveling route TR_actual along which the vehicle 1 actually travels during a period when the driver drives the vehicle 1 so that the vehicle 1 reaches the complete waypoint WP_end from the start waypoint WP_start via the shift change waypoint WP_shift. Thus, the parking assist unit 132 is capable of generating the target route TR_target that is less likely affected by a driver's unnecessary operation, compared to a parking assist unit in a comparison example that is configured to generate the target route TR_target on the basis of the learned result of the actual traveling route TR_actual.

Figure 4:
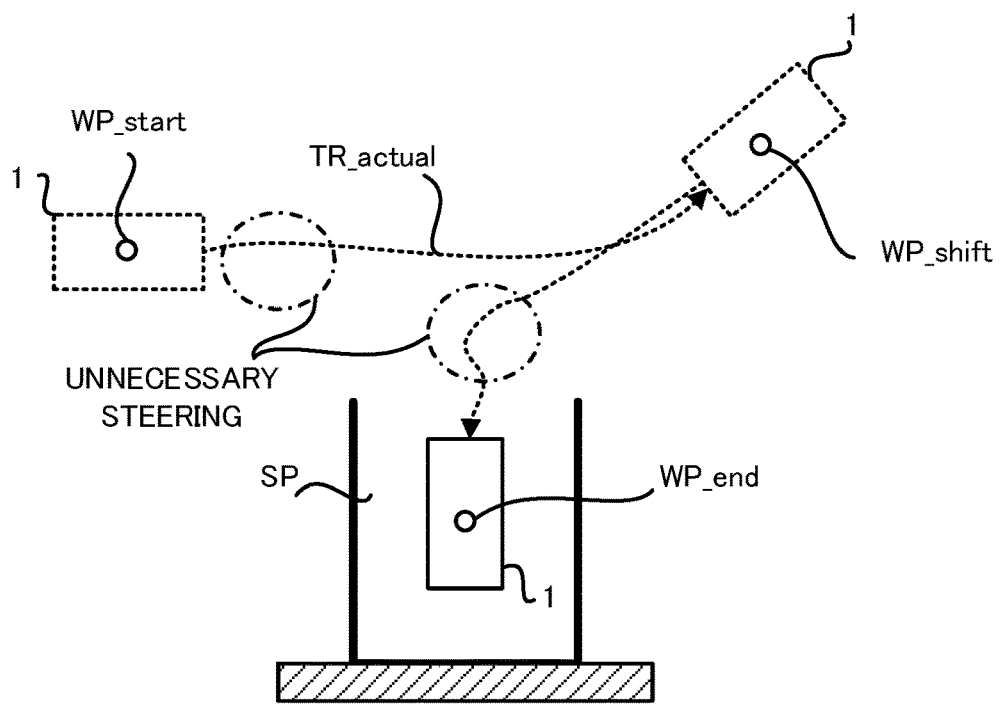
FIG. 4 is a planar view that illustrates a traveling route along which the vehicle actually travels when a driver parks the vehicle in a parking space by performing a parking operation.

Specifically, FIG. 4 is a planar view that illustrates the actual traveling route TR_actual along which the vehicle 1 actually travels when the driver parks the vehicle 1 in the parking space SP by performing the parking operation. As illustrated in FIG. 4, there is a relatively high possibility that the actual traveling route TR_actual is affected by the driver's unnecessary operation. The driver's unnecessary operation includes an unnecessary steering operation that is at least one portion of a steering operation for steering the steered wheel and that does not contribute to the parking of the vehicle 1, for example. The steering operation that does not contribute to the parking of the vehicle 1 corresponds to a steering operation without which the vehicle 1 can be parked in the parking space SP appropriately. The steering operation that does not contribute to the parking of the vehicle 1 includes at least one of a first steering operation for steering the steered wheel too much and a second steering operation for returning the steered wheel that is already steered too much, for example. If the actual traveling route TR_actual is affected by the driver's unnecessary operation like this, the parking assist unit in the comparison example generates the target route TR_target that is also affected by the driver's unnecessary operation. Therefore, there is a possibility that the parking assist unit in the comparison example is not capable of generating the appropriate target route TR_target that allows the vehicle 1 to be parked in the parking space SP efficiently.

Figure 5:
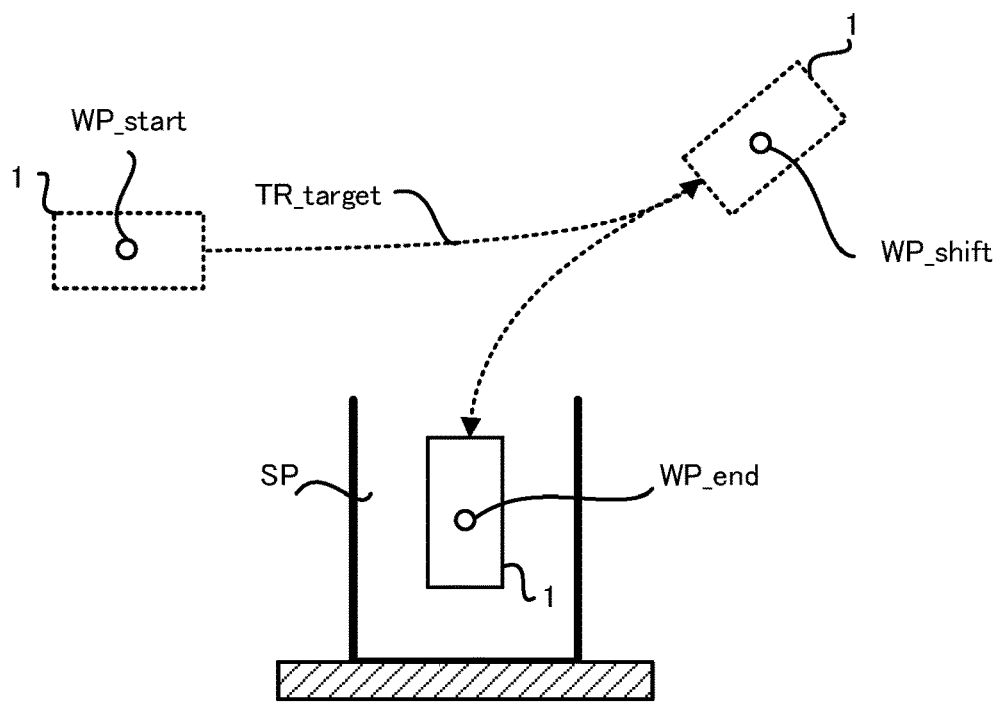
FIG. 5 is a planar view that illustrates a target route generated by a parking assist unit in the present embodiment.

On the other hand, FIG. 5 is a planar view that illustrates the target route TR_target generated by the parking assist unit 132 in the present embodiment. In the present embodiment, the parking assist unit 132 generates the target route TR_target on the basis of the start waypoint WP_start, the shift change waypoint WP_shift and the complete waypoint WP_end, as described above. Namely, the parking assist unit 132 does not generate the target route TR_target on the basis of the actual traveling route TR_actual (especially, a line shape of the actual traveling route TR_actual). Thus, there is lower possibility that the target route TR_target generated by the parking assist unit 132 is affected by the driver's unnecessary operation, compared to the target route TR_target generated by the parking assist unit in the comparison example. Therefore, the parking assist unit 132 is capable of generating the appropriate target route TR_target that allows the vehicle 1 to be parked in the parking space SP more efficiently, compared to the parking assist unit in the comparison example. As a result, the parking assist unit 132 is capable of parking the vehicle 1 in the parking space SP while allowing the vehicle 1 to travel along the appropriate traveling route.

Moreover, in the present embodiment, the learning unit 131 need not store an information that relates to a learned result of the actual traveling route TR_actual. Namely, it is enough for the learning unit 131 to store an information that relates to the learned result of the start waypoint WP_start, the shift change waypoint WP_shift and the complete waypoint WP_end. Thus, an amount of the information stored in the learning unit 131 in the present embodiment is smaller than that in the comparison example. Thus, a load of the learning unit 131 for storing the information can be reduced.

(4) Modified Example

Next, modified examples of the learning process and the parking assist process will be described.

(4-1) First Modified Example (4-1-1) Learning Process in First Modified Example

Figure 6:
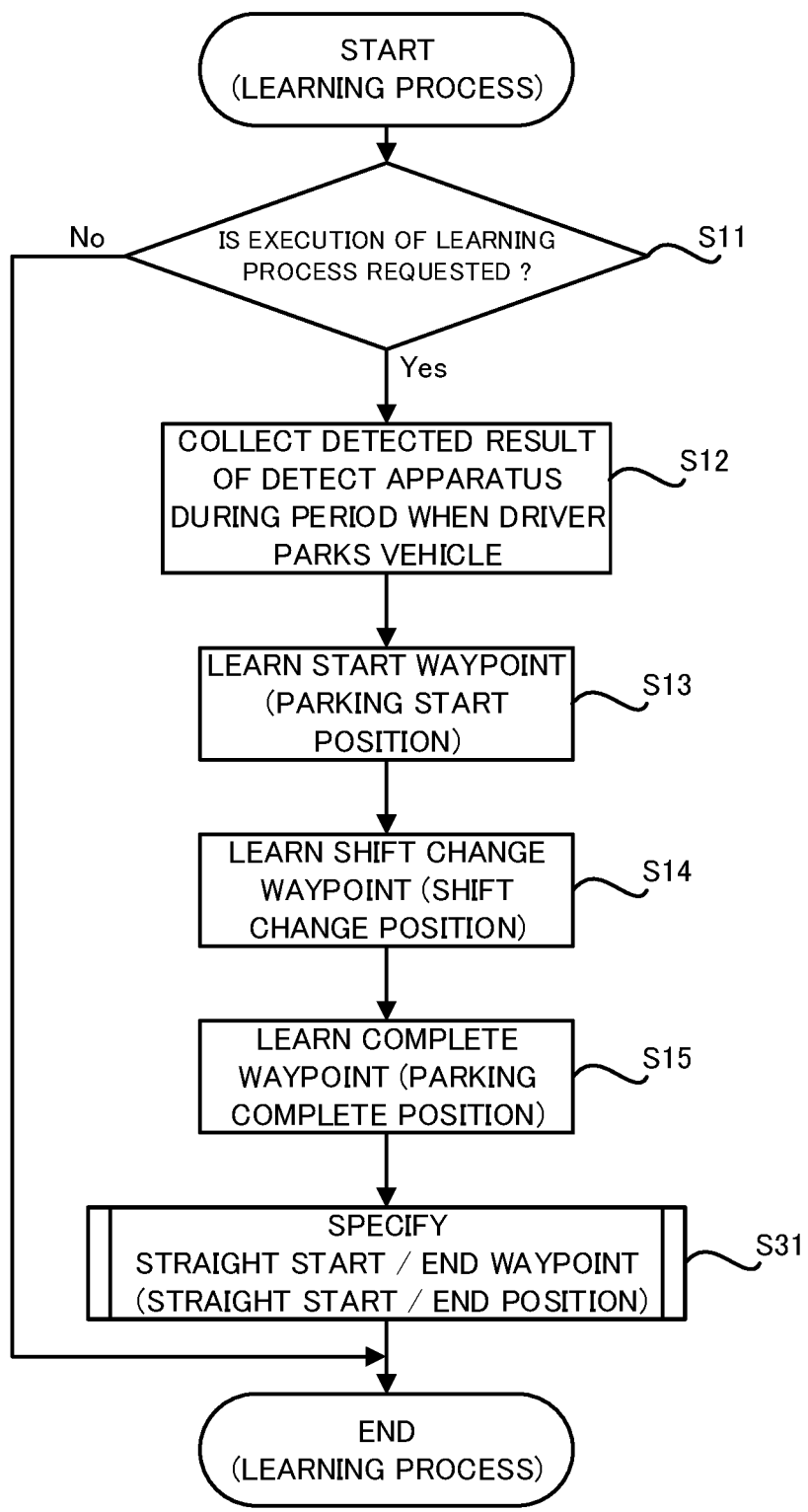
FIG. 6 is a flowchart that illustrates a flow of the learning process in a first modified example.

Firstly, with reference to FIG. 6, a flow of the learning process in the first modified example will be described. FIG. 6 is a flowchart that illustrates the flow of the learning process in the first modified example.

As illustrated in FIG. 6, the learning unit 131 also executes the processes from the step S11 to the step S15 in the first modified example. Moreover, in the first modified example, the learning unit 131 specifies a straight traveling start waypoint WP_st1 and a straight traveling end waypoint WP_st2 on the basis of the detection information collected at the step S12 (a step S31). The straight traveling start waypoint WP_st1 corresponds to the position of the vehicle 1 at a timing when a straight traveling period starts, wherein the straight traveling period is a period during which the driver performs a straight traveling operation that contributes to the parking of the vehicle 1. Namely, the straight traveling start waypoint WP_st1 corresponds to the position of the vehicle 1 at a timing when the driver starts to perform the straight traveling operation that contributes to the parking of the vehicle 1. The straight traveling end waypoint WP_st2 corresponds to the position of the vehicle 1 at a timing when the straight traveling period ends. Namely, the straight traveling end waypoint WP_st2 corresponds to the position of the vehicle 1 at a timing when the driver ends the straight traveling operation that contributes to the parking of the vehicle 1.

The straight traveling operation is an operation for allowing the vehicle 1 to travel straightforwardly. The straight traveling operation is typically an operation for making the vehicle 1 travel frontward or backward while steering the steered wheel slightly so that the vehicle 1 travels straightforwardly in the situation where the steered wheel is in the neutral position (namely, while adjusting the steered angle slightly so that the vehicle 1 travels straightforwardly in the situation where the steered angle is zero). The straight traveling operation that contributes to the parking of the vehicle 1 corresponds to a straight traveling operation without which the vehicle 1 cannot be parked in the parking space SP appropriately. Namely, the straight traveling operation that contributes to the parking of the vehicle 1 corresponds to a straight traveling operation without which the vehicle 1 has to travel along an inappropriate traveling route (for example, at least one of a traveling route that is too long and a traveling route that is too curved) in order to park the vehicle 1 in the parking space SP. Therefore, the straight traveling operation that contributes to the parking of the vehicle 1 substantially corresponds to a straight traveling operation that is necessary to park the vehicle 1 in the parking space SP appropriately. In other words, the straight traveling operation that contributes to the parking of the vehicle 1 corresponds to a straight traveling operation other than a straight traveling operation that does not contribute to the parking of the vehicle 1. The straight traveling operation that does not contributes to the parking of the vehicle 1 corresponds to a straight traveling operation without which the vehicle 1 can be parked in the parking space SP appropriately. Namely, the straight traveling operation that does not contribute to the parking of the vehicle 1 substantially corresponds to a straight traveling operation that is unnecessary to park the vehicle 1 in the parking space SP appropriately. In other words, the straight traveling operation that does not contribute to the parking of the vehicle 1 substantially corresponds to an unnecessary straight traveling operation.

Note that the straight traveling period during which the driver performs the straight traveling operation does not include a period during which the driver performs the steering operation. Namely, when the driver performs the steering operation, the driver starts to perform the straight traveling operation after ending the steering operation. On the other hand, when the driver performs the straight traveling operation, the driver starts to perform the steering operation after ending the straight traveling operation. Thus, the straight traveling start waypoint WP_st1 is equivalent to the position of the vehicle 1 at a timing when a steering period ends, wherein the steering period is a period during which the driver performs the steering operation. Similarly, the straight traveling end waypoint WP_st2 is equivalent to the position of the vehicle 1 at a timing when the steering period starts.

Figure 7:
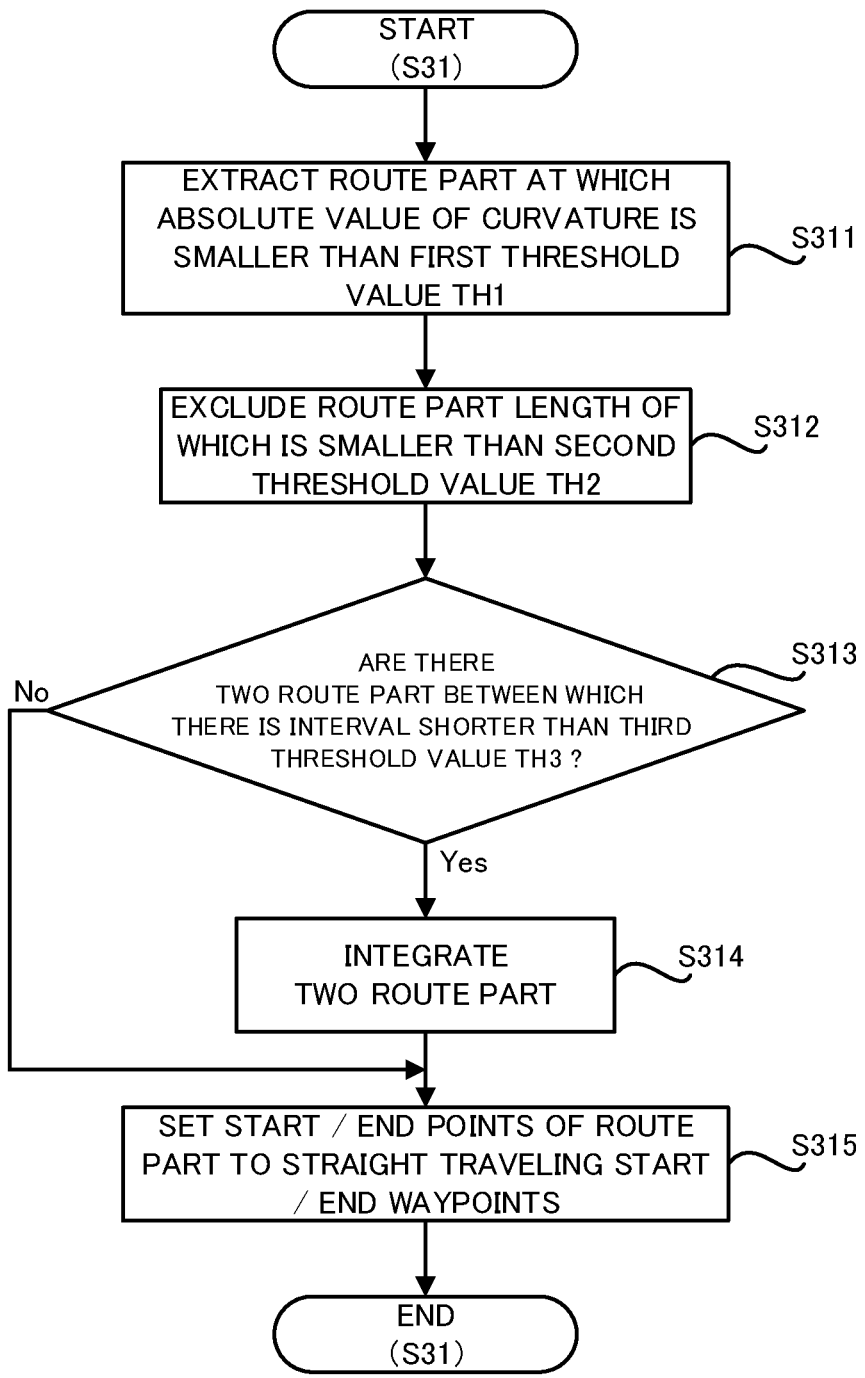
FIG. 7 is a flowchart that illustrates a flow of a process of specifying a straight traveling start waypoint and a straight traveling end waypoint.

Next, with reference to FIG. 7 and FIG. 8A to FIG. 8E, a process of specifying the straight traveling start waypoint WP_st1 and the straight traveling end waypoint WP_st2 will be described. FIG. 7 is a flowchart that illustrates a flow of the process of specifying the straight traveling start waypoint WP_st1 and the straight traveling end waypoint WP_st2. Each of FIG. 8A to FIG. 8E is a graph that illustrates a curvature of the actual traveling route TR_actual.

Figure 8A:
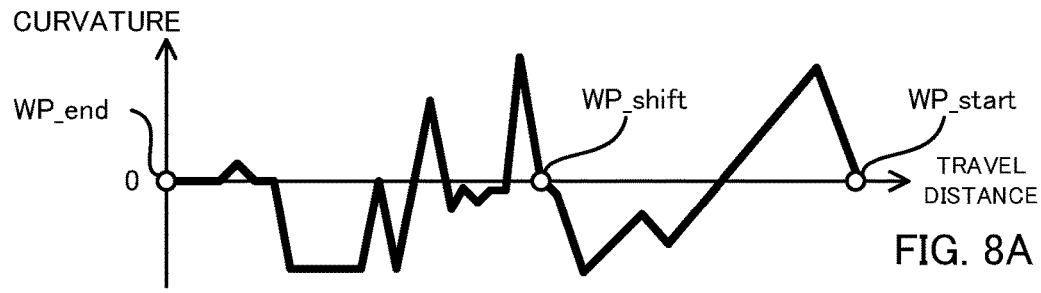
Figure 8B:
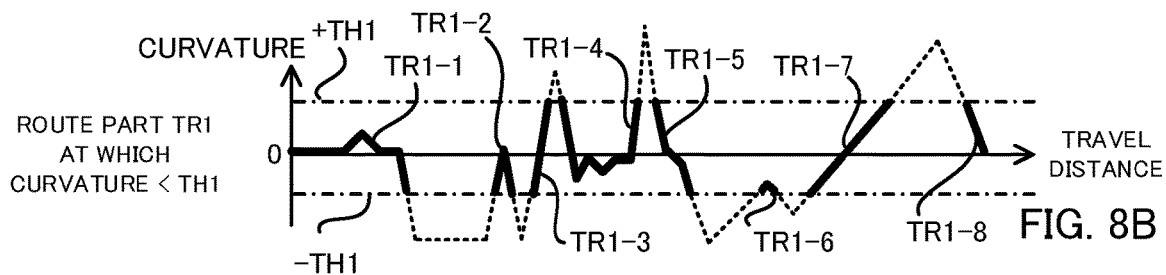

As illustrated in FIG. 7, the WP learning part 1311 extracts, from the actual traveling route TR_actual, a route part TR1 that is at least one portion of the actual traveling route TR_actual and at which an absolute value of the curvature is smaller than a predetermined first threshold value TH1 (a step S311). Note that the first threshold value TH1 is a positive value. For example, when the curvature of the actual traveling route TR_actual varies as illustrated in FIG. 8A, the WP learning part 1311 extracts a plurality of route parts TR1 (specifically, a route part TR1-1 to a route part TR1-8) at each of which the curvature is smaller than +TH1 and larger than −TH1 as illustrated by thick solid lines in FIG. 8B. Note that the WP learning part 1311 may extract single route part TR1 or may extract no route part TR1 although FIG. 8B illustrates an example in which the WP learning part 1311 extracts the plurality of route parts TR1.

When the absolute value of the curvature is larger than the first threshold value TH1 (namely, is relatively large), there is a higher possibility that the driver performs the steering operation that contributes to the parking of the vehicle 1, compared to the case where the absolute value of the curvature is smaller than the first threshold value TH1 (namely, is relatively small). Thus, there is a relatively high possibility that the driver performs the steering operation that contributes to the parking of the vehicle 1 during a period during which the absolute value of the curvature is larger than the first threshold value TH1. Note that the steering operation that contributes to the parking of the vehicle 1 corresponds to the steering operation other than the above described unnecessary steering operation that does not contribute to the parking of the vehicle 1. On the other hand, there is a relatively high possibility that the driver performs the straight traveling operation that contributes to the parking of the vehicle 1 during a period during which the absolute value of the curvature is smaller than the first threshold value TH1. Thus, the WP learning part 1311 is capable of appropriately specifying (in other words, distinguishing) the straight traveling operation and the steering operation on the basis of the curvature.

Incidentally, it is preferable that the first threshold value TH1 be set to an appropriate value that allows the WP learning part 1311 to distinguish the straight traveling operation from the steering operation on the basis of the curvature of the traveling route of the vehicle 1, considering the above described technical reason why the WP learning part 1311 determines a magnitude relationship between the first threshold value TH1 and the curvature of the actual traveling route TR_actual.

On the other hand, even if the route part TR1 at which the absolute value of the curvature is smaller than the first threshold value TH1 is extracted, if a length of the extracted route part TR1 is relatively short, there is a relatively high possibility that the driver performs only the steering operation for reversing the steered wheel so that the position of the steered wheel returns to the neutral position at the extracted route part TR1 in the middle of repeatedly steering the steered wheel unnecessarily. Namely, there is a relatively high possibility that the driver performs the straight traveling operation that does not contribute to the parking of the vehicle 1 at the route part TR1 at which the absolute value of the curvature is smaller than the first threshold value TH1 and the length of which is relatively short.

Figure 8C:
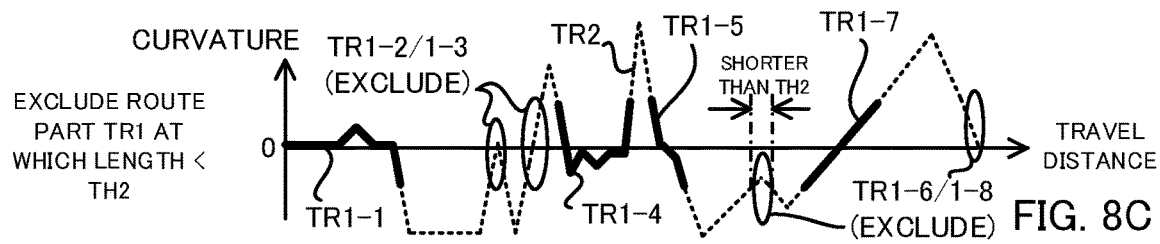

Thus, the WP learning part 1311 excludes the route part TR1 the length of which is shorter than a predetermined second threshold value TH2 among the route part(s) TR1 extracted at the step S311 (a step S312). For example, when the route part TR1-1 to the route part TR1-8 are extracted at the step S311 as illustrated by the thick solid lines in FIG. 8B, the WP learning part 1311 excludes four route parts TR1-2, TR1-3, TR1-6 and TR1-8 the length of each of which is shorter than the second threshold value TH2 as illustrated in FIG. 8C. As result of the execution of the step S312, the WP learning part 1311 substantially extracts the route part TR1 at which the absolute value of the curvature is smaller than the first threshold value TH1 and the length of which is larger than the second threshold value TH2. As a result, the WP learning part 1311 is capable of appropriately specifying the route part TR1 that corresponds to the straight traveling period during which the driver performs the straight traveling operation that contributes to the parking of the vehicle 1 on the basis of not only the curvature but also the length.

Incidentally, it is preferable that the second threshold value TH2 be set to an appropriate value that allows the WP learning part 1311 to distinguish the straight traveling operation that contributes to the parking of the vehicle 1 from the straight traveling operation that does not contribute to the parking of the vehicle 1 on the basis of the length of the route part TR1, considering the above described technical reason why the WP learning part 1311 determines a magnitude relationship between the second threshold value TH2 and the length of the route part TR1.

Then, the WP learning part 1311 determines whether or not the route parts TR1 extracted at the step S311 and not excluded at the step S312 include two adjacent route parts TR1 between which there is an interval a length of which is smaller than a predetermined third threshold value TH3 (a step S313). Note that the third threshold value TH3 is a positive value. Namely, if the actual traveling route TR_actual is divided into the route part TR1 and a route part TR2 other than the route part TR1 (namely, a route part TR2 at which the absolute value of the curvature is larger than the first threshold value TH1 or the length of which is shorter than the second threshold value TH2), the WP learning part 1311 determines whether or not there are two adjacent route parts TR1 between which there is the route part TR2 the length of which is smaller than the third threshold value TH3 (the step S313). Hereinafter, two adjacent route part TR1 between which there is the route part TR2 the length of which is smaller than the third threshold value TH3 are referred to as "one route part TR1" and "the other route part TR1", respectively.

Figure 8D:
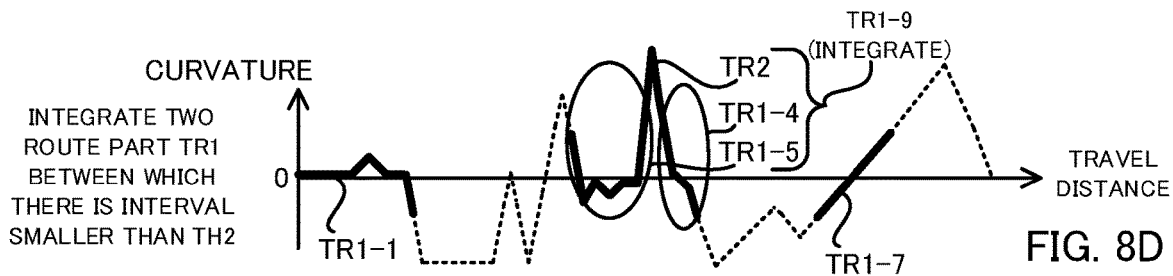
Figure 8E:
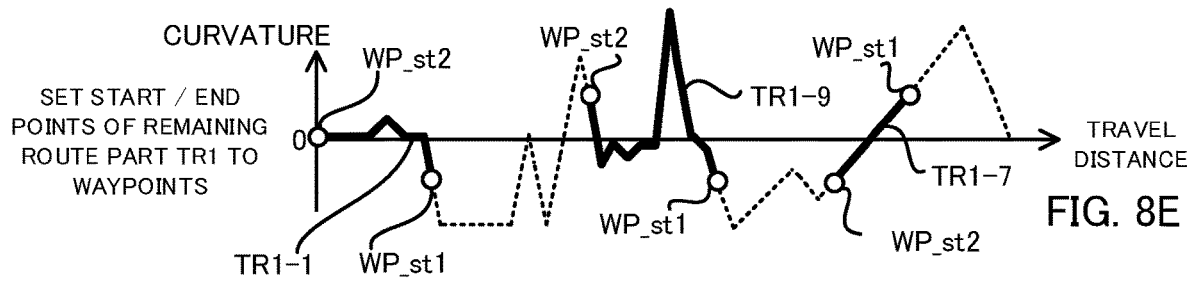

As a result of the determination at the step S313, if it is determined that there are two adjacent route parts TR1 between which there is the route part TR2 the length of which is smaller than the third threshold value TH3 (the step S313: Yes), it is presumed that the driver performs the straight traveling operation performed at one route part TR1 soon after or before performing the straight traveling operation performed at the other route part TR1. In this case, it matters little if the straight traveling operation performed at one route part TR1 and the straight traveling operation performed at the other route part TR1 are regarded as a series of straight traveling operation that contributes to the parking of the vehicle 1. Thus, the WP learning part 1311 integrates these two route parts TR1 and the route part TR2 that is between these two route parts TR1 and set the route part obtained by the integration to new one route part TR1 (a step S314). For example, when there remain the route parts TR1-1, TR1-4, TR1-5 and TR1-7 as illustrated by thick solid lines in FIG. 8C, the WP learning part 1311 integrates the route parts TR1-4 and TR1-5 and the route part TR2 that is between the route parts TR1-4 and TR1-5 and set the route part obtained by the integration to new one route part TR1-9, as illustrated in FIG. 8C and FIG. 8D.

Then, the WP learning part 1311 specifies a position of a start point (in other words, a beginning point) of the remaining route part TR1 as the straight traveling start waypoint WP_st1 (a step S315). Moreover, the WP learning part 1311 specifies a position of an end point of the remaining route part TR1 as the straight traveling end waypoint WP_st2 (the step S315). For example, when there remain the route parts TR1-1, TR1-7 and TR1-9 as illustrated by thick solid lines in FIG. 8E, the WP learning part 1311 specifies a position of the start point of each of the route parts TR1-1, TR1-7 and TR1-9 as the straight traveling start waypoint WP_st1. Moreover, the WP learning part 1311 specifies a position of the end point of each of the route parts TR1-1, TR1-7 and TR1-9 as the straight traveling end waypoint WP_st2. Note that FIG. 9 illustrates one example of a relationship between the straight traveling start waypoint WP_st1 and the straight traveling end waypoint WP_st2 illustrated in FIG. 8E and the actual traveling route TR_actual.

A waypoint information that relates to the straight traveling start waypoint WP_st1 and the straight traveling end waypoint WP_st2 specified by the WP learning part 1311 is stored by the WP storing part 1312.

(4-1-2) Parking Assist Process in First Modified Example

Next, with reference to FIG. 10, a flow of the parking assist process in the first modified example will be described. FIG. 10 is a flowchart that illustrates the flow of the parking assist process in the first modified example.

As illustrated in FIG. 10, the parking assist unit 132 also executes the process at the step S21 in the first modified example.

As a result of the determination at the step S21, if it is determined that the driver requests the execution of the parking assist process (the step S21: Yes), the information reading part 1321 reads the waypoint information that relates to the straight traveling start waypoint WP_st1 and the straight traveling end waypoint WP_st2 in addition to the waypoint information that relates to the start waypoint WP_start, the shift change waypoint WP_shift and the complete way point WP_end (a step S42).

Then, the route generating part 1322 generates, as the target route TR_target, a traveling route that reaches the complete waypoint WP_end from the start waypoint WP_start via the shift change waypoint WP_shift, the straight traveling start waypoint WP_st1 and the straight traveling end waypoint WP_st2 on the basis of the read waypoint information (a step S43). Then, the vehicle controlling part 1323 makes the vehicle 1 automatically travel along the target route TR_target generated at the step S43 (the step S24).

(4-1-3) Technical Effect in First Modified Example

According to the learning process and the parking assist process in the first modified example, it is possible to achieve a technical effect that is same as the technical effect achieved by the learning process and the parking assist process in the above described embodiment.

Moreover, in the first modified example, the parking assist unit 132 uses the straight traveling start waypoint WP_st1 and the straight traveling end waypoint WP_st2 in generating the target route TR_target, in order to allow the route part TR1 at which the driver performs the straight traveling operation that contributes to the parking of the vehicle 1 to be reflected in the target route TR_target. Thus, the route generating part 1322 is capable of generating more appropriate target route TR_target (especially, the target route TR_target that is less likely affected by the unnecessary steering operation) based on the straight traveling operation that contributes to the parking of the vehicle 1.

Moreover, if two adjacent route parts TR1 between which there is the route part TR2 the length of which is smaller than the third threshold value TH3 are integrated, the number of the route part(s) TR1 that remain(s) to the end is reduced. Thus, the number of the straight traveling start waypoint(s) WP_st1 and the straight traveling end waypoint(s) WP_st2 is also reduced. Thus, the route generating part 1322 is capable of generating more efficient target route TR_target that is less likely affected by the unnecessary steering operation.

Note that the learning unit 131 specifies the straight traveling start waypoint WP_st1 and the straight traveling end waypoint WP_st2 on the basis of the curvature of the actual traveling route TR_actual in the above describe description. However, the learning unit 131 may specify the straight traveling start waypoint WP_st1 and the straight traveling end waypoint WP_st2 on the basis of any steer information that relates to the steering of the steered wheel (namely, any steer information that is correlated with a steered state of the steered wheel) in addition to or instead of the curvature of the actual traveling route TR_actual. Namely, the learning unit 131 may extract, as the above described route part TR1, a route part at which an absolute value of an index value represented by the steer information relating to the steering of the steered wheel is smaller than the first threshold value TH1 optimized to adapt to the index value at the step S311 in FIG. 7. The steer information may include at least one of a steered angle information that relates to the steered angle of the steered wheel, a deviated information that relates to a deviated angle of the vehicle 1 and a steering angle information that relates to the steering angle of the steering wheel of the vehicle 1, for example. It is possible to achieve a technical effect that is same as the above described technical effect even in this case.

(4-2) Second Modified Example

In the above described description, the route generating part 1322 generates the target route TR_target that reaches the complete waypoint WP_end from the start waypoint WP_start via the shift change waypoint WP_shift. This method of generating the target route TR_target is effective especially when the vehicle 1 is located at or near the start waypoint WP_start at the timing when the parking assist unit 132 starts the parking assist process.

On the other hand, the vehicle 1 may not be located at or near the start waypoint WP_start at the timing when the parking assist unit 132 starts the parking assist process in some cases. In the second modified example, the route generating part 1322 generates the appropriate target route TR_target when the vehicle 1 is not located at or near the start waypoint WP_start at the timing when the parking assist unit 132 starts the parking assist process.

Specifically, as illustrated in FIG. 11A, the vehicle 1 may be located on a route from the start waypoint WP_start to the shift change waypoint WP_shift at the timing when the parking assist unit 132 starts the parking assist process in some cases. Alternatively, the vehicle 1 may be located within a predetermined distance from the route from the start waypoint WP_start to the shift change waypoint WP_shift at the timing when the parking assist unit 132 starts the parking assist process in some cases. In this case, the route generating part 1322 generates the target route TR_target that reaches the complete waypoint WP_end from a current position WP_current of the vehicle 1 via the shift change waypoint WP_shift as illustrated in FIG. 11B. Namely, the route generating part 1322 need not generate the target route TR_target that returns from the current position WP_current of the vehicle 1 to the start waypoint WP_start and then reaches the complete waypoint WP_end via the shift change waypoint WP_shift.

Alternatively, the vehicle 1 may be located on (alternatively, within a predetermined distance from) a route from the shift change waypoint WP_shift to the complete waypoint WP_end at the timing when the parking assist unit 132 starts the parking assist process in some cases. In this case, the route generating part 1322 generates the target route TR_target that reaches the complete waypoint WP_end from the current position WP_current of the vehicle 1. Namely, the route generating part 1322 need not generate the target route TR_target that returns from the current position WP_current of the vehicle 1 to the start waypoint WP_start and then reaches the complete waypoint WP_end via the shift change waypoint WP_shift. Moreover, the route generating part 1322 need not generate the target route TR_target that returns from the current position WP_current of the vehicle 1 to the shift change waypoint WP_shift and then reaches the complete waypoint WP_end.

As described above, in the second modified example, the route generating part 1322 is capable of generating the target route TR_target based on the current position of the vehicle 1.

Note that the same applies to the case where the straight traveling start waypoint WP_st1 and the straight traveling end waypoint WP_st2 are used. Namely, the route generating part 1322 may generate the target route TR_target that does not pass through at least one of the straight traveling start waypoint WP_st1 and the straight traveling end waypoint WP_st2, when the vehicle 1 has to travel to be away from the complete waypoint WP_end if the vehicle 1 tries to reach the complete waypoint WP_end via at least one of the straight traveling start waypoint WP_st1 and the straight traveling end waypoint WP_st2.

(4-3) Another Modified Example

The learning unit 131 may learn an attitude of the vehicle 1 (in other words, a posture or a direction of the vehicle 1) at the start waypoint WP_start, the attitude of the vehicle 1 at the shift change waypoint WP_shift and the attitude of the vehicle 1 at the complete waypoint WP_end. The learning unit 131 may learn the attitude of the vehicle 1 at the straight traveling start waypoint WP_st1 and the attitude of the vehicle 1 at the straight traveling end waypoint WP_st2. In this case, the parking assist unit 132 may generate the target route TR_target on the basis of the learned result of the attitude of the vehicle 1.

(5) Additional Statement

Relating to the above described embodiment, following additional statements will be disclosed.

(5-1) Additional Statement 1

A parking assist apparatus according to the additional statement 1 is a parking assist apparatus having: a learning device that is configured to learn a first position, a second position and a third position during a period when a driver performs a parking operation for parking a vehicle, the first position being a position of the vehicle when the driver starts to perform the parking operation, the second position being a position of the vehicle when the driver changes a shift range of the vehicle, the third position being a position when the driver completes the parking operation; and a generating device that is configured to generate, as a target route along which the vehicle should travel when the vehicle is automatically parked, a traveling route that reaches the third position from the first position via the second position on the basis of a learned result of the learning device.

A parking assist apparatus according to the additional statement 1 may be a parking assist apparatus having a controller, the controller being programmed to learn a first position, a second position and a third position during a period when a driver performs a parking operation for parking a vehicle, the first position being a position of the vehicle when the driver starts to perform the parking operation, the second position being a position of the vehicle when the driver changes a shift range of the vehicle, the third position being a position when the driver completes the parking operation; and generate, as a target route along which the vehicle should travel when the vehicle is automatically parked, a traveling route that reaches the third position from the first position via the second position on the basis of a learned result.

In the parking assist apparatus according to the additional statement 1, it is enough for the learning device to learn the first position, the second position and the third position. Namely, the learning device need not learn the traveling route that reaches the third position from the first position via the second position. Thus, the parking assist apparatus according to the additional statement 1 is capable of generating the target route that is less likely affected by a driver's unnecessary operation, compared to a parking assist apparatus in a comparison example that is configured to generate the target route on the basis of the learned result of the traveling route that reaches the third position from the first position via the second position. Namely, the parking assist apparatus according to the additional statement 1 is capable of generating the appropriate target route that allows the vehicle to be parked in a parking space more efficiently, compared to the parking assist apparatus in the comparison example. As a result, the parking assist apparatus according to the additional statement 1 is capable of parking the vehicle in the parking space while allowing the vehicle to travel along the appropriate (in other words, desired) traveling route.

(5-2) Additional Statement 2

A parking assist apparatus according to the additional statement 2 is the parking assist apparatus according to the additional statement 1, wherein the generating device is configured to generate, as the target route, a traveling route that reaches the third position from a current position of the vehicle via the second position, if the vehicle is located in the middle of a traveling route from the first position to the second position at a parking start timing at which the vehicle starts to be automatically parked, the generating device is configured to generate, as the target route, a traveling route that reaches the third position from the current position of the vehicle without passing through the second position, if the vehicle is located in the middle of a traveling route from the second position to the third position at the parking start timing, and the generating device is configured to generate, as the target route, a traveling route that reaches the third position from the first position via the second position, if the vehicle is located at the first position that corresponds to a start point of a traveling route from the first position to the third position via the second position at the parking start timing.

A parking assist apparatus according to the additional statement 2 may be the parking assist apparatus according to the additional statement 1, wherein the controller is programmed to generate, as the target route, a traveling route that reaches the third position from a current position of the vehicle via the second position, if the vehicle is located in the middle of a traveling route from the first position to the second position at a parking start timing at which the vehicle starts to be automatically parked, the controller is programmed to generate, as the target route, a traveling route that reaches the third position from the current position of the vehicle without passing through the second position, if the vehicle is located in the middle of a traveling route from the second position to the third position at the parking start timing, and the controller is programmed to generate, as the target route, a traveling route that reaches the third position from the first position via the second position, if the vehicle is located at the first position that corresponds to a start point of a traveling route from the first position to the third position via the second position at the parking start timing.

The parking assist apparatus according to the additional statement 2 is capable of generating the appropriate target route based on the current position of the vehicle.

(5-3) Additional Statement 3

A parking assist apparatus according to the additional statement 3 is the parking assist apparatus according to the additional statement 1 or 2, wherein the learning device is configured to specify a fourth position and a fifth position on the basis of a steer information, the steer information is an information that relates to a steering of a steered wheel of the vehicle when the driver performs the parking operation, the fourth position is a position of the vehicle at the beginning of a period during which the driver performs a straight travelling operation as one portion of the parking operation, the fifth position is a position of the vehicle at the end of the period during which the driver performs the straight travelling operation as one portion of the parking operation, the straight traveling operation is an operation that allows the vehicle to travel straightforwardly to contribute to the parking of the vehicle, the generating device is configured to generate, as the target route, a traveling route that reaches the third position from the first position via the second, fourth and fifth positions.

A parking assist apparatus according to the additional statement 3 may be the parking assist apparatus according to the additional statement 1 or 2, wherein the controller is programmed to specify a fourth position and a fifth position on the basis of a steer information, the steer information is an information that relates to a steering of a steered wheel of the vehicle when the driver performs the parking operation, the fourth position is a position of the vehicle at the beginning of a period during which the driver performs a straight travelling operation as one portion of the parking operation, the fifth position is a position of the vehicle at the end of the period during which the driver performs the straight travelling operation as one portion of the parking operation, the straight traveling operation is an operation that allows the vehicle to travel straightforwardly to contribute to the parking of the vehicle, the controller is programmed to generate, as the target route, a traveling route that reaches the third position from the first position via the second, fourth and fifth positions.

The parking assist apparatus according to the additional statement 3 is capable of generating the appropriate target route based on the straight traveling operation that contributes to the parking of the vehicle performed by the parking operation of the driver. Especially, the parking assist apparatus according to the additional statement 3 is capable of generating the appropriate target route that is less likely affected by an unnecessary steering.

(5-4) Additional Statement 4

A parking assist apparatus according to the additional statement 4 is the parking assist apparatus according to the additional statement 3, wherein the steer information includes at least one of a steered angle of the steered wheel, a curvature information that relates to a curvature of a traveling route of the vehicle, a deviated angle information that relates to a deviated angle of the vehicle and a steering angle of a steering wheel of the vehicle.

In the parking assist apparatus according to the additional statement 4, the learning device is capable of appropriately specifying the fourth position and the fifth position.

(5-5) Additional Statement 5

A parking assist apparatus according to the additional statement 5 is the parking assist apparatus according to the additional statement 4, wherein the learning device is configured to extract a first route part from an actual traveling route, the actual traveling route is a traveling route along which the vehicle actually travels when the driver performs the parking operation, the first route part satisfies a predetermined condition in which an absolute value of at least one of the steered angle, the curvature, the deviated angle and the steering angle is smaller than a first threshold value and a length of the first route part is longer than a second threshold value, the learning device is configured to specify, as the fourth position and the fifth position, a start point of the extracted first route part and an end point of the extracted first route part, respectively.

A parking assist apparatus according to the additional statement 5 may be the parking assist apparatus according to the additional statement 4, wherein the controller is programmed to extract a first route part from an actual traveling route, the actual traveling route is a traveling route along which the vehicle actually travels when the driver performs the parking operation, the first route part satisfies a predetermined condition in which an absolute value of at least one of the steered angle, the curvature, the deviated angle and the steering angle is smaller than a first threshold value and a length of the first route part is longer than a second threshold value, the controller is programmed to specify, as the fourth position and the fifth position, a start point of the extracted first route part and an end point of the extracted first route part, respectively.

The parking assist apparatus according to the additional statement 5 is capable of appropriately specifying, from the actual traveling route, the first route part along which the vehicle actually travels when the driver performs the straight traveling operation that contributes to the parking of the vehicle. As a result, the learning device is capable of appropriately specifying the fourth position and the fifth position.

(5-6) Additional Statement 6

A parking assist apparatus according to the additional statement 6 is the parking assist apparatus according to the additional statement 5, wherein if the learning device extracts two first route parts between which a second route part is located, the learning device is configured to specify, as new first route part, a route part that is obtained by integrating the two first route parts and the second route part, the second route part does not satisfy the predetermined condition and a length of the second route part is smaller than a third threshold value.

A parking assist apparatus according to the additional statement 6 may be the parking assist apparatus according to the additional statement 5, wherein if two first route parts between which a second route part is located are extracted, the controller is programmed to specify, as new first route part, a route part that is obtained by integrating the two first route parts and the second route part, the second route part does not satisfy the predetermined condition and a length of the second route part is smaller than a third threshold value.

In the parking assist apparatus according to the additional statement 6, the learning device is capable of reducing the total number of the first route part(s). As a result, the learning device is also capable of reducing the total number of the fourth position(s) and the fifth position(s) that are specified by the learning device. Thus, the parking assist apparatus according to the additional statement 6 is capable of generating the target route (especially, the appropriate target route that is less likely affected by the unnecessary steering) more efficiently, compared to the case where the total number of the fourth position(s) and the fifth position (s) are not reduced, when the parking assist apparatus according to the additional statement 6 generates the target route.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2017-235053, filed on Dec. 12, 2017, the entire contents of which are incorporated herein by reference. In addition, the entire contents of the above described Patent Literatures 1 to 3 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A parking assist apparatus, which involve such changes, are also intended to be within the technical scope of the present invention.

REFERENCE SIGNS LIST 1 vehicle
11 external surrounding detect apparatus
12 internal condition detect apparatus
13 ECU
131 learning unit
1311 WP learning part
1312 WP storing part
132 parking assist unit
1321 information reading part
1322 route generating part
1323 vehicle controlling part
TR_actual actual traveling route
TR_target target route
TR1, TR2 route part
WP waypoint
WP_start start waypoint
WP_shift shift change waypoint
WP_end complete waypoint
WP_st1 straight traveling start waypoint
WP_st2 straight traveling end waypoint
WP_current current position
SP parking space

The invention claimed is:

1. A parking assist apparatus comprising a controller, the controller being programmed to: learn a first position, a second position and a third position during a period when a driver performs a parking operation for parking a vehicle, the first position being a position of the vehicle when the driver starts to perform the parking operation, the second position being a position of the vehicle when the driver changes a shift range of the vehicle, the third position being a position when the driver completes the parking operation; and generate, as a target route along which the vehicle travels when the vehicle is automatically parked, a traveling route that reaches the third position from the first position via the second position on the basis of a learned result, wherein the controller is programmed to generate, as the target route, a traveling route that reaches the third position from a current position of the vehicle via the second position, if the vehicle is located in the middle of a traveling route from the first position to the second position at a parking start timing at which the vehicle starts to be automatically parked, the controller is programmed to generate, as the target route, a traveling route that reaches the third position from the current position of the vehicle without passing through the second position, if the vehicle is located in the middle of a traveling route from the second position to the third position at the parking start timing, and the controller is programmed to generate, as the target route, a traveling route that reaches the third position from the first position via the second position, if the vehicle is located at the first position that corresponds to a start point of a traveling route from the first position to the third position via the second position at the parking start timing.

2. The parking assist apparatus according to claim 1, wherein
the controller is programmed to specify a fourth position and a fifth position on the basis of a steer information, the steer information is an information that relates to a steering of a steered wheel of the vehicle when the driver performs the parking operation, the fourth position is a position of the vehicle at the beginning of a period during which the driver performs a straight travelling operation as one portion of the parking operation, the fifth position is a position of the vehicle at the end of the period during which the driver performs the straight travelling operation as one portion of the parking operation, the straight traveling operation is an operation that allows the vehicle to travel straightforwardly to contribute to the parking of the vehicle, the controller is programmed to generate, as the target route, a traveling route that reaches the third position from the first position via the second, fourth and fifth positions.

3. A parking assist apparatus comprising a controller, the controller being programmed to: learn a first position, a second position and a third position during a period when a driver performs a parking operation for parking a vehicle, the first position being a position of the vehicle when the driver starts to perform the parking operation, the second position being a position of the vehicle when the driver changes a shift range of the vehicle, the third position being a position when the driver completes the parking operation; and generate, as a target route along which the vehicle travels when the vehicle is automatically parked, a traveling route that reaches the third position from the first position via the second position on the basis of a learned result, wherein the controller is programmed to generate, as the target route, a traveling route that reaches the third position from a current position of the vehicle via the second position, if the vehicle is located in the middle of a traveling route from the first position to the second position at a parking start timing at which the vehicle starts to be automatically parked, the controller is programmed to generate, as the target route, a traveling route that reaches the third position from the current position of the vehicle without passing through the second position, if the vehicle is located in the middle of a traveling route from the second position to the third position at the parking start timing, and the controller is programmed to generate, as the target route, a traveling route that reaches the third position from the first position via the second position, if the vehicle is located at the first position that corresponds to a start point of a traveling route from the first position to the third position via the second position at the parking start timing; and wherein the controller is programmed to specify a fourth position and a fifth position on the basis of a steer information, the steer information is an information that relates to a steering of a steered wheel of the vehicle when the driver performs the parking operation, the fourth position is a position of the vehicle at the beginning of a period during which the driver performs a straight travelling operation as one portion of the parking operation, the fifth position is a position of the vehicle at the end of the period during which the driver performs the straight travelling operation as one portion of the parking operation, the straight traveling operation is an operation that allows the vehicle to travel straightforwardly to contribute to the parking of the vehicle, the controller is programmed to generate, as the target route, a traveling route that reaches the third position from the first position via the second, fourth and fifth positions.

4. The parking assist apparatus according to claim 3, wherein the steer information includes at least one of a steered angle of the steered wheel, a curvature information that relates to a curvature of a traveling route of the vehicle, a deviated angle information that relates to a deviated angle of the vehicle and a steering angle of a steering wheel of the vehicle.

5. The parking assist apparatus according to claim 4, wherein the controller is programmed to extract a first route part from an actual traveling route, the actual traveling route is a traveling route along which the vehicle actually travels when the driver performs the parking operation, the first route part satisfies a predetermined condition in which an absolute value of at least one of the steered angle, the curvature, the deviated angle and the steering angle is smaller than a first threshold value and a length of the first route part is longer than a second threshold value, the controller is programmed to specify, as the fourth position and the fifth position, a start point of the extracted first route part and an end point of the extracted first route part, respectively.

6. The parking assist apparatus according to claim 5, wherein if two first route parts between which a second route part is located are extracted, the controller is programmed to specify, as new first route part, a route part that is obtained by integrating the two first route parts and the second route part, the second route part does not satisfy the predetermined condition and a length of the second route part is smaller than a third threshold value.

* * * * *